June 3, 1924.
T. A. MARTIN
1,496,240
VEHICLE PLATFORM TILTING MECHANISM
Filed Jan. 10, 1923    2 Sheets-Sheet 2
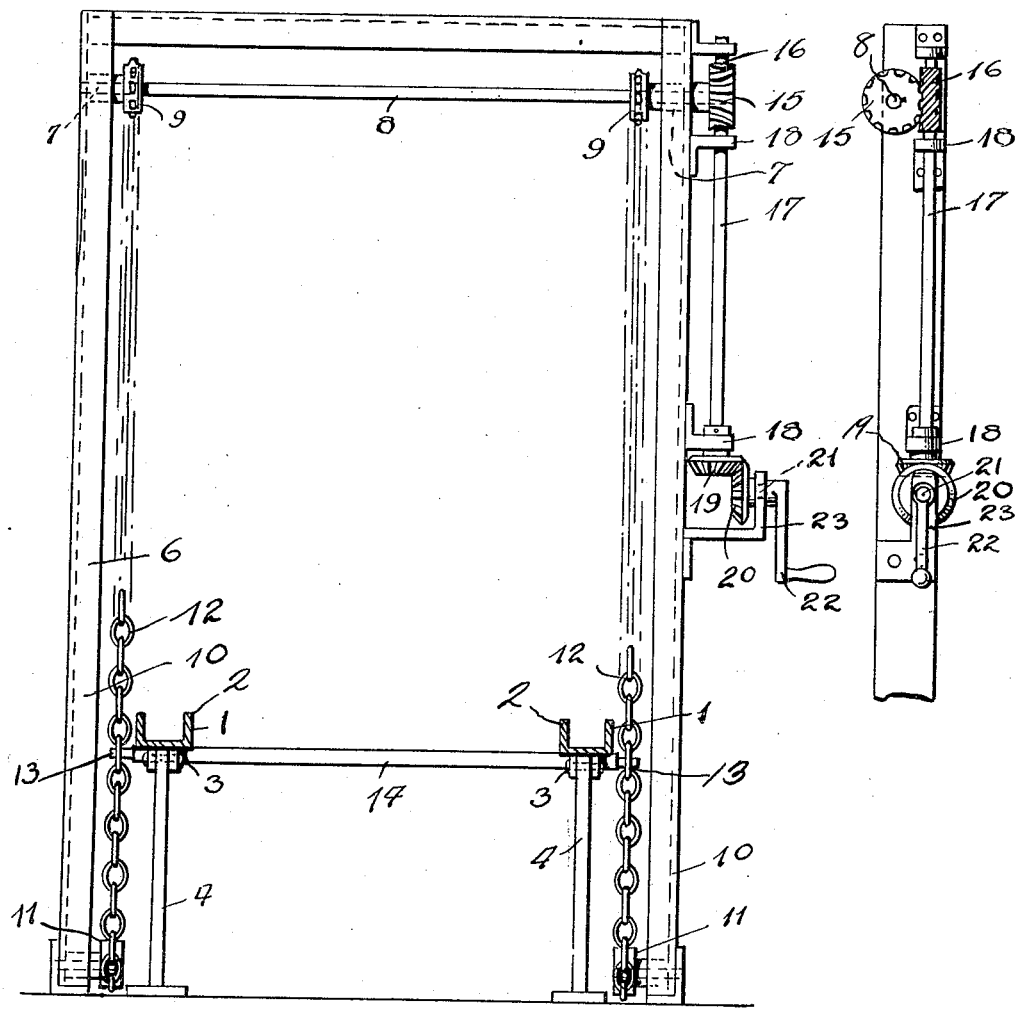
Inventor
Thomas A. Martin
By D. Swift
Attorney Patented June 3, 1924.

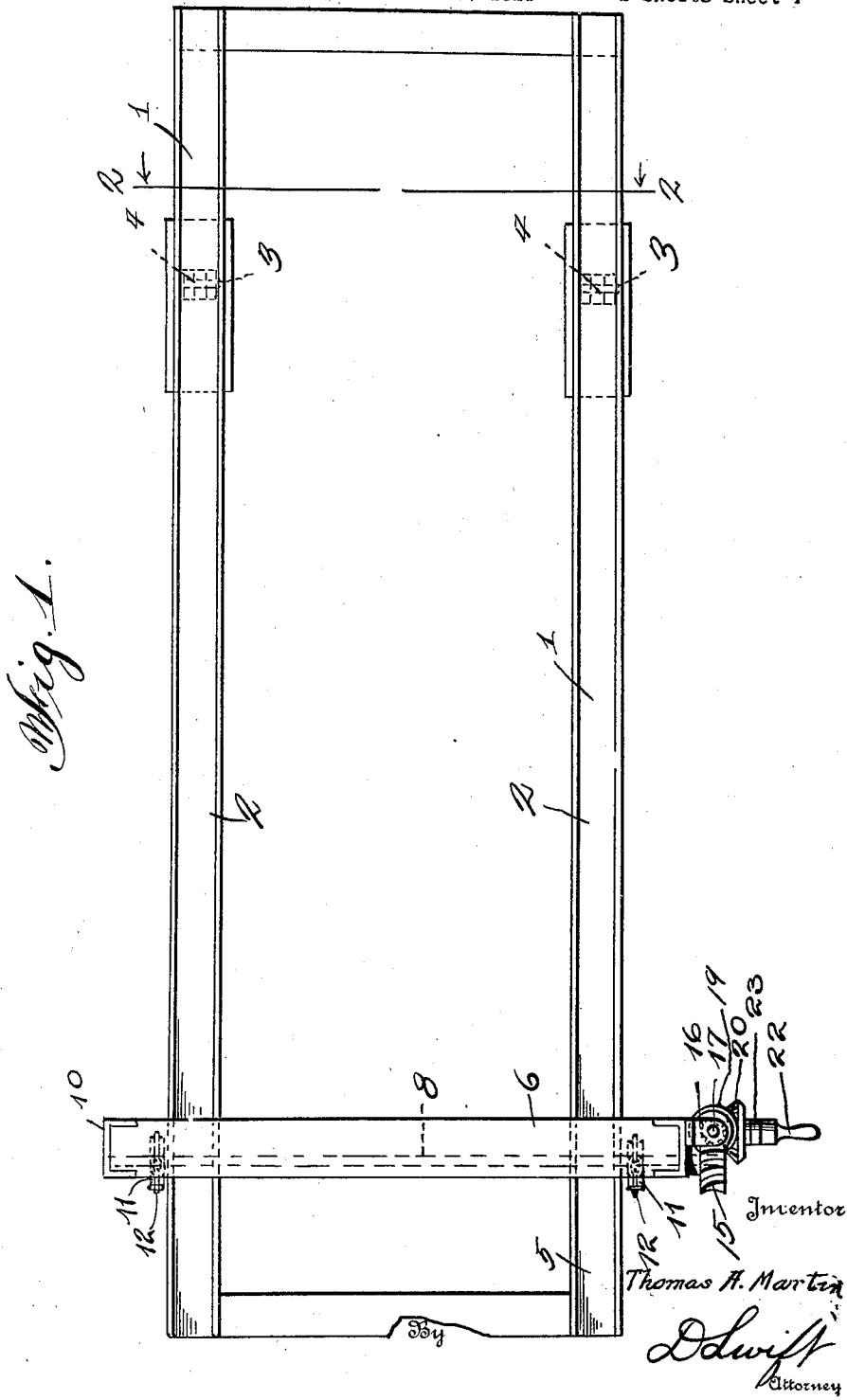

1,496,240

UNITED STATES PATENT OFFICE.

THOMAS A. MARTIN, OF BRIDGEPORT, CONNECTICUT.

VEHICLE PLATFORM-TILTING MECHANISM.

Application filed January 10, 1923. Serial No. 611,727.

*To all whom it may concern:*

Be it known that I, THOMAS A. MARTIN, a citizen of the United States, residing at Bridgeport, in the county of Fairfield, State of Connecticut, have invented a new and useful Vehicle Platform-Tilting Mechanism; and I do hereby declare the following to be a full, clear, and exact description of the invention, such as will enable others skilled in the art to which it appertains to make and use the same.

The invention relates to mechanisms for tilting vehicle receiving platforms, and has for its object to provide a device of this character comprising a frame adapted to be disposed adjacent one end of a pivoted platform, and provided with endless chains extending over pulleys. The chains are connected together by means of a transversely disposed detachable bar adapted to engage under the end of the platform, and to move said platform upwardly upon an upward movement of the bar.

A further object is to provide a shaft carried by the upper pulleys, said shaft being provided with a gear with which a worm cooperates. The worm is carried by a downwardly extending shaft terminating in a gear, with which gear a crank operated gear meshes. The gears, worm and worm gears form means whereby the device may be positively actuated and also form means whereby the tiltable platform will be held in tilted position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention, In the drawing:—

Figure 1 is a top plan view of the device showing the same located adjacent one end of the tiltable platform.

Figure 2 is a vertical transverse sectional view through the device taken on line 2—2 of Figure 1.

Figure 3 is an enlarged side elevation of the upper end of one side of the U-shaped frame showing the operating mechanism.

Referring to the drawing, the numeral 1 designates a tiltable platform, which platform is formed from spaced parallel channels 2, for the reception of the wheels of an automobile. The automobile or other vehicle is placed on the tiltable platform 1 by tilting the same until one of its ends engages the floor. The platform 1 is pivotally connected at 3 to supporting brackets 4, which rest on the floor in the usual manner. Heretofore cable means has been used, or a block and tackle for raising the end 5 of the platform for tilting the same. Where devices of this character are used, it is necessary to provide means for holding the platform and mechanism against movement under the weight of the platform and the vehicle disposed thereon. To obviate this difficulty the hereinafter described mechanism is operated through gear and worm and worm gear mechanism, which worm and worm gear prevent retrograde movement except upon the rotation of the worm. To accomplish the above result a U-shaped frame 6 is provided, which frame is preferably portable, so that it may be moved away from the platform 1 if so desired, however when in use, it preferably arches the end 5 of the platform 1, and has rotatably mounted in bearings 7 adjacent its upper end, a transversely disposed shaft 8, which shaft 8 is provided with chain pulleys 9 adjacent the arms 10 of the frame. Disposed adjacent the lower ends of the arms 10 of the frame are chain pulleys 11, and extending over the chain pulleys 9 and 11, endless chains 12 extend, the sides of which will be moved upwardly or downwardly according to the rotation of the shaft 8. Detachably connected at 13 to oppositely disposed sections of the chains is a transversely disposed bar 14, which bar engages the underside of the end 5 of the platform, and when moved upwardly raises the platform 5 for positioning the platform at an angle to the floor, or allowing the free end of the frame to move downwardly under the weight of the vehicle or the platform. Heretofore the shaft 8 has been rotated by various sprocket and chain mechanisms, which have been found impractical, as to the amount of power necessary, and also on account of the retrograde movement thereof incident to the weight of the vehicle on the tiltable platform. To obviate this difficulty the shaft 8 is provided with a worm gear 15, with which gear a vertically disposed worm 16 meshes, and when rotated rotates the shaft 8 according to the direction of rotation of the worm 16. By providing a worm and worm gear connection, it will be seen that the weight of the vehicle on the tiltable platform will not cause retrograde movement of the worm 16 through the worm gear 15, and consequently the platform will be held in position by the worm. The worm 16 is carried by a vertically disposed shaft 17, which is rotatably mounted in bearings 18 carried by one of the arms 10 of the U-shaped frame 6, the lower end of the shaft being provided with a bevelled gear 19, which meshes with a bevelled gear 20 carried by a crank shaft 21, which crank shaft is provided with a hand operating crank 22, and rotatably mounted in a bearing of the bracket 23 carried by the arm 10. It will be seen that when the operating crank 22 is rotated manually that the shaft 17 will be rotated through the bevelled gears 19 and 20 and consequently the worm 16 will be rotated for imparting rotation to the worm gear 15 and the transversely disposed shaft 8, thereby raising or lowering the end 5 of the tiltable platform according to the direction of rotation of the crank 22.

From the above it will be seen that a vehicle platform tilting mechanism is provided, which mechanism is gear and shaft operated through a worm and worm gear, and consequently held against retrograde movement by the worm, and also that the device is positive in operation, the parts reduced to a minimum and one which may be cheaply constructed and sold.

The invention having been set forth what is claimed as new and useful is:—

1. The combination with a tiltable pivoted vehicle receiving platform, of means located adjacent one end of the platform for tilting the same, said means comprising a frame, a transversely disposed shaft adjacent the upper end of the frame, pulleys carried by said shaft, pulleys carried adjacent the lower ends of the frame, endless flexible members extending around said pulleys, a worm gear carried by one end of the shaft, a vertically disposed shaft, a worm carried by the vertically disposed shaft and meshing with the worm gear, a gear carried by the lower end of the shaft, a horizontally disposed shaft, a gear carried by the horizontally disposed shaft and meshing with the gear carried by the lower end of the vertically disposed shaft, a crank carried by the horizontally disposed shaft, said endless flexible members having one of their sides detachably connected to the tiltable platform.

2. The combination with a tiltable platform, pivoted and movable in a vertical plane, of means for moving said tiltable frame, said means comprising a U-shaped frame arching the end of the platform, a transversely disposed shaft carried by the frame above the platform, pulleys carried by the shaft, pulleys disposed adjacent the lower end of the frame, a transversely disposed bar connected to opposite sides of endless chains extending over the pulleys, and worm and worm gear means for rotating the shaft.

3. The combination with the free end of a pivoted platform, said platform being movable in a vertical plane, of means for moving said platform, said means comprising a removable frame arching the end of the platform, endless chains carried by the frame and passing over pulleys adjacent the upper and lower ends of the frame, the pulleys at one end of the frame being carried by a shaft, and worm and worm gear means for rotating said shaft.

4. The combination with the free end of a tiltable vehicle platform movable in a vertical plane, of means cooperating with the free end of the platform for moving the same upwardly, said means comprising a frame, endless flexible members carried by the frame and passing over pulleys, means for rotating said pulleys and a transversely disposed bar detachably connected to opposite sections of the endless flexible members and engaging under the free end of the platform.

5. The combination with the free end of a pivoted vehicle platform movable in a vertical plane, of means for raising said free end of the platform, said means comprising a removable frame, hoisting mechanism carried by the frame, said hoisting mechanism actuating a transversely and horizontally disposed bar disposed under the free end of the frame.

In testimony whereof I have signed my name to this specification.

THOMAS A. MARTIN.